United States Patent [19]

Saia et al.

[11] Patent Number: 4,805,491
[45] Date of Patent: Feb. 21, 1989

[54] THROTTLE VALVE WITH DETENT FEEL

[75] Inventors: Steven R. Saia, Plymouth; Edward F. Militello, Brighton, both of Mich.

[73] Assignee: General Motors Corporation, Detroit, Mich.

[21] Appl. No.: 155,879

[22] Filed: Feb. 16, 1988

[51] Int. Cl.[4] ............................................. B60K 41/16
[52] U.S. Cl. .................................................... 74/867
[58] Field of Search ........................ 74/867; 137/116.3

[56] References Cited

U.S. PATENT DOCUMENTS

| 3,171,433 | 3/1965 | Borman, Jr. et al. | 137/495 |
| 3,893,472 | 7/1975 | Schuster | 137/116.3 |
| 4,257,441 | 3/1981 | Iwanaga et al. | 137/116.3 |

FOREIGN PATENT DOCUMENTS

| 0043539 | 1/1982 | European Pat. Off. | 74/867 |
| 2844665 | 4/1980 | Fed. Rep. of Germany | 74/867 |

Primary Examiner—Dirk Wright
Attorney, Agent, or Firm—Donald F. Scherer

[57] ABSTRACT

A throttle valve supplies a pressure substantially proportional to the throttle position established by the operator. The throttle pressure is used as a control signal in automatic transmissions to effect the timing of ratio interchanges. A detent sleeve is slidably disposed in the body of the valve and prevented from movement in one direction by a locking ring. The sleeve is slidably positioned on the manual plunger and urged against the locking ring by hydraulic pressure. The sleeve is disposed in a position to be engaged by the operator input when the full throttle or "detent throttle" position is reached. After abutment of the sleeve by the operator input, a step function increase in operator input force is necessary for further throttle movement. This informs the operator that a predetermined throttle position has been reached.

2 Claims, 1 Drawing Sheet

THROTTLE VALVE WITH DETENT FEEL

BACKGROUND OF THE INVENTION

This invention relates to transmission control valves and more particularly to operator controlled transmission valves.

The prior art devices which establish a detent position feel for the operator, generally use a separate operator control valve or a solenoid valve. It is also possible to use a secondary spring within the throttle valve to increase the resistance to throttle movement when the throttle detent position is reached. Another approach taken by the prior art is to permit the detent position to be reached without increasing the reaction force felt by the operator at the throttle pedal.

SUMMARY OF THE INVENTION

The present invention provides for a "detent feel" mechanism for the operator which is incorporated into the throttle valve. A sleeve member is slidably disposed in a throttle valve assembly and has a central portion that slidably supports a manual plunger of the throttle valve. A sensing area is formed on the sleeve and subjected to throttle pressure. The sleeve is limited in movement away from the sensing member by a stop member, such as a locking ring. The outer end of the sleeve is disposed in the path of the operator control member such that at the throttle detent position, the operator control engages the sleeve. Upon further movement of the operator control, the operator must overcome the pressure urging the sleeve against the stop member. The increased input force requirement informs the operator that the detent position has been reached by the throttle.

It is therefore an object of this invention to provide an improved throttle valve for a transmission control wherein a "detent feel" mechanism is incorporated into the throttle valve.

It is another object of this invention to provide an improved throttle valve for a transmission control wherein a sleeve member, slidably supporting a manual plunger for the throttle valve is urged against a stop member by throttle pressure, and further wherein a manual input member operating against the manual plunger contacts the sleeve member at the throttle detent position so that the operator must overcome the pressure load on the sleeve member to accomplish further throttle movement thereby providing a "detent feel" for the operator.

It is a further object of this invention is to provide an improved manually operated throttle valve wherein a detent sleeve member is disposed coaxial with a manual plunger and is opposed from movement in one direction by a pressured area formed thereon, and wherein an operator input which is manually operated to move the manual plunger will abut the detent sleeve end, due to the pressurized area, encounter an increase in the input force requirement which the operator must overcome if further throttle movement is desired whereby a "detent feel" is obtained.

These and other objects and advantages of the present invention will be more apparent from the following description and drawings.

DESCRIPTION OF THE PREFERRED EMBODIMENT

Figure 1:
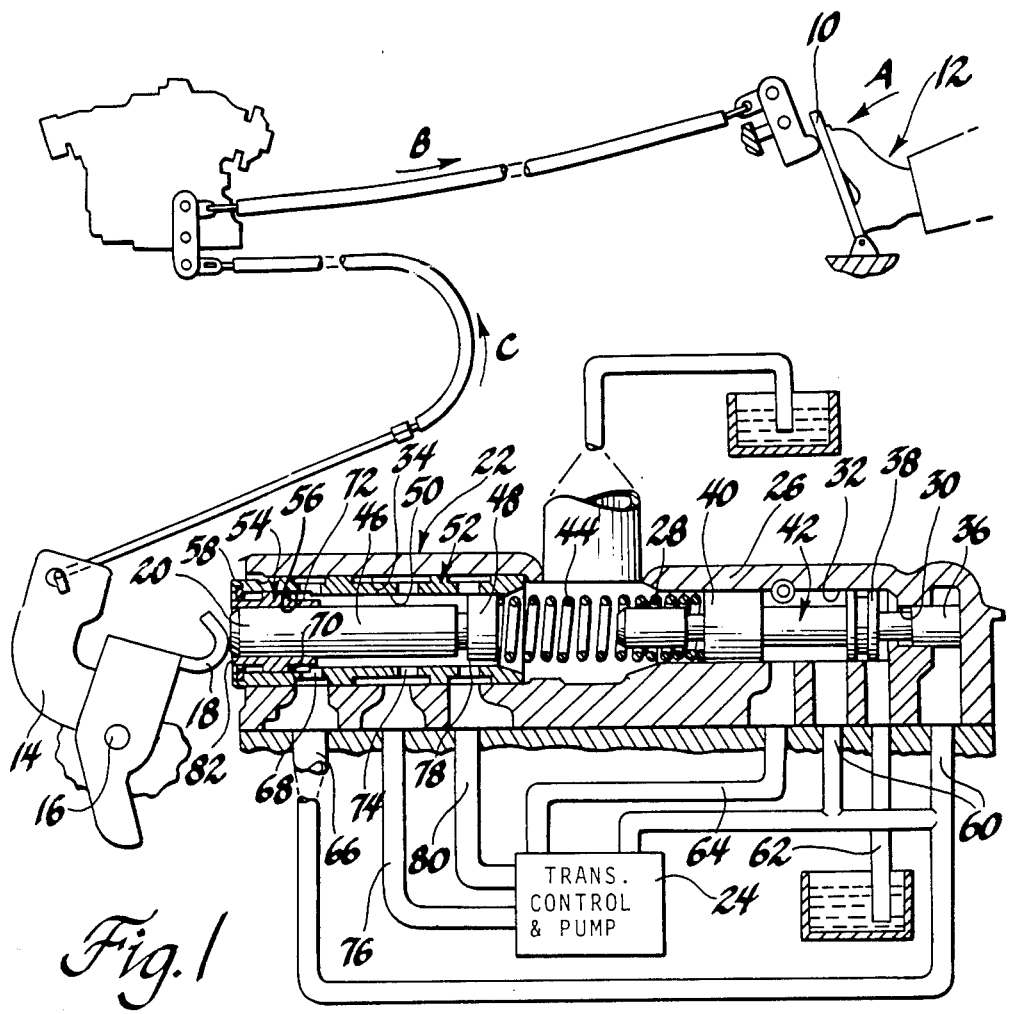
FIG. 1 is a diagrammatic view showing a throttle valve incorporating the present invention in one mode of operation.

Referring to the drawings, wherein like characters represent the same or corresponding parts throughout the several views, there is seen in FIG. 1 a vehicle accelerator or throttle pedal 10 which is controlled by an operator 12. The throttle pedal, when moved in the direction of Arrow A, causes movement within a cable system in the direction of Arrows B and C. The movement of throttle pedal 10 results in a change in the fuel feed setting of the engine and also in rotation of a manual input member 14 which is disposed to control a portion of an automatic transmission, not shown. The manual member 14 is pivotally mounted on a pin 16 and has an abutting portion 18 which is disposed in abutment with a manual plunger 20 of a throttle valve, generally designated 22.

The throttle valve 22 is but one of the many valves incorporated into a transmission control, represented by the box 24. The conventional transmission control 24 is comprised of valves, such as a pressure regulator, shift valves and shift timing valves. The box 24 also represents a conventional positive displacement pump which provides a fluid pressure source for the operation of various transmission control elements and for the valving.

The throttle valve 22 has a housing 26 in which is formed a stepped diameter bore 28 having a small diameter portion 30, an intermediate diameter portion 32 and a large diameter portion 34. The small diameter portion 30 and intermediate diameter portion 32 are slidably engaged by lands 36, and 38, 40, respectively, of a valve spool 42. The valve spool 42 is urged rightward in the bore 24 by a spring member 44 which is disposed between the valve spool 42 and the plunger 20. The position of the plunger 20 is determined by the operator 12 who is responsible for positioning the input member 14.

Figure 2:
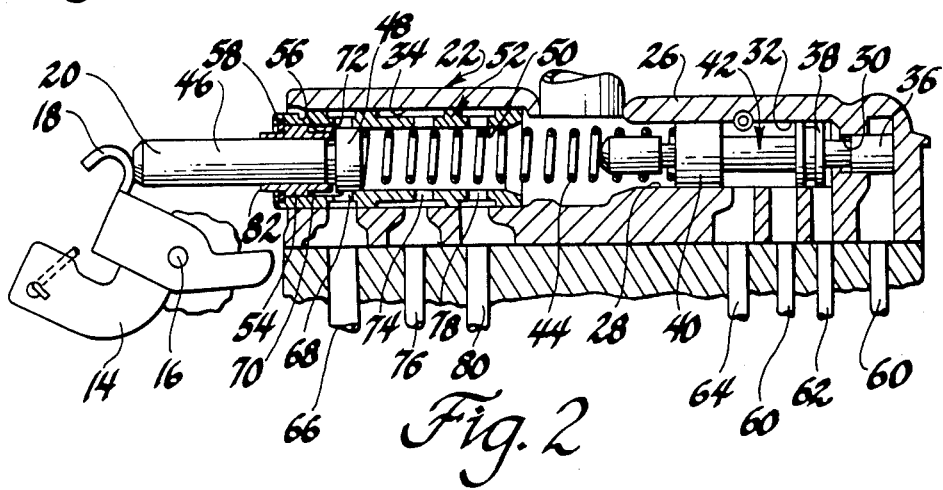
FIG. 2 is a diagrammatic view showing a throttle valve incorporating the present invention in another mode of operation.

In FIG. 2, the input member 14 is at the closed throttle position, represented by no input force from the operator, while FIG. 1 depicts the input member 14 at the full throttle position, representing the maximum movement of the throttle pedal 10 by the operator 12. Thus, the two extremes of the operating range of spring 44 are shown. The plunger 20 has a stem portion 46 and a head or large diameter portion 48. The large diameter portion 48 is slidably disposed in a bore 50 formed in a sleeve or bushing 52, which is secured in the large diameter 34 of the stepped diameter bore 28. The stem 46 is slidably disposed in a detent sleeve member 54, which is slidably disposed in a diameter 56 of sleeve 52. The diameter 56 is larger than the diameter 50. The sleeve 52 also has a stepped diameter bore comprised of the diameters 50 and 56. The sleeve 52 has secured therein, a lock ring 58 which serves to limit the leftmost movement of detent sleeve 54 and plunger 20. This position is seen in FIG. 2.

The right end of valve spool 42 adjacent land 36 is open to fluid pressure from a TV passage 60. The TV passage 60 is also in communication with the space between the lands 38 and 40 in the intermediate diameter 28. The intermediate diameter 28 is also in communication with an exhaust passage 62 and an inlet pressure passage 64. Pressurized fluid in passage 64 is supplied by a conventional hydraulic pump and regulator valve which are components of the transmission control 24.

The valve spool 42 is essentially a downstream pressure regulator. That is, the valve spool accepts a high upstream pressure but maintains the downstream pressure at or below the upstream pressure depending on the spring bias force or other pilot force that might be imposed thereon.

The valve shown in FIGS. 1 and 2 has only the spring force imposed thereon as a bias. During operation, high pressure is communicated from passage 64 to the space between lands 38 and 40. This pressure is communicated to passage 60 between lands 38 and 40. The pressure in passage 60 acts on the right end of land 36 to urge the valve spool 42 leftward against the spring 44. Sufficient leftward movement of the valve spool 42 will cause the passage 60 to be closed at the passage 64 so that further pressure increase in passage 60 cannot occur. The pressure required to cause this closure of passage 60 is established by the force in spring 44.

If the force in spring 44 is increased, the pressure in passage 60 will increase. If the force in spring 44 is decreased, the pressure acting on the end of valve land 36 will cause the valve spool 42 to move leftward such that passage 60 will be connected between lands 36 and 38 with the exhaust passage 62 thereby permitting a reduction in the value of the pressure within passage 60 until the spring force is balanced.

Generally, the operator 12 would feel these changes in pressure that occur because of movement of the plunger 20. To prevent the spring force from being felt by the operator, it has been the general practice to direct the throttle pressure in passage 60 to a differential area on the manual plunger 20. In the present disclosure, this is accomplished by connecting the passage 60 to a passage 66, which is in fluid communication through a port 68 in the bushing 52 with the differential area between the diameters of the stem 46 and head 48.

As will be apparent from viewing the drawings, the pressure imposed on this differential area will act in the same direction as the operator input force and is proportional to the throttle valve pressure in passage 60. The pressure acting on the differential area also acts on the differential area represented by an annulus 70 formed on the detent sleeve 54 and an annulus 72 which represent the difference between the diameters 50 and 56 of the sleeve 52. The pressure acting on this differential area urges the detent sleeve 54 into abutment with the lock ring 58.

During operation of the transmission, it is often useful to have a pressure signal which is representative of a partial throttle condition being achieved within the transmission control. This is provided by a port or passage 74 formed in the bushing 52. As the plunger 20 moves from the closed throttle shown in FIG. 2 to the full throttle position shown in FIG. 1, the head 48 of plunger 20 will cause the passage 74 to be opened to the fluid pressure passage 66. The port 74 communicates with a part throttle passage 76 which communicates with the transmission control 24.

It is also desired within transmission controls to have a full throttle pressure signal to provide a full throttle pressure signal. A passage 78 is formed in the bushing 52 which is in communication with a full throttle or detent passage 80, which in turn communicates to the transmission control 24. The passage 78 becomes open to the throttle pressure in passage 66 when the head 48 of plunger 20 has been moved sufficiently to the right to open the passage 78.

Prior to the opening of the full throttle or detent passage 78, it is generally desirable to inform the operator that such an event is about to occur. The reason for providing the operator with this information is that generally a forced downshift will occur when passage 80 is pressurized.

The present invention provides that operator information through the detent sleeve 54. the detent sleeve 54 has an annular surface 82 which is abutted by abutting portion 18 of the manual input member 14 which is prior to the passage 78 being opened by plunger 20. Since the sleeve 54 has a leftward force imposed thereon by the pressure acting against the left face of detent sleeve 54 the operator perceives an input force change upon further movement of the throttle pedal 10. Thus, the operator is aware that the detent or full throttle position is about to be achieved.

This provides a compact and easily adjustable throttle detent system. If it is desirable to change the throttle detent force for a given throttle mechanism, it is a simply matter to provide the sleeves 52 and 54 with different mating diameters to increase or decrease the force of "detent feel". Thus, the "detent feel" can be tailored for individual transmission models and may be further useful in situations where the same or very similar transmissions are used for various size automobiles.

The embodiments of the invention in which an exclusive property or privilege is claimed are defined as follows:

1. A pressure regulating throttle valve for use with a power transmission and a manually operated accelerator pedal movable to a plurality of positions by an operator, said pressure regulating valve comprising: a valve body having a stepped diameter central bore; a downstream pressure regulator valve spool slidably disposed in a first portion of said stepped diameter bore of said valve body; a bushing slidably disposed in a second portion of said stepped diameter bore of said valve body at a location displaced longitudinally from said valve spool, said bushing including a centrally disposed stepped diameter bore; a sleeve slidably disposed in one portion of said stepped diameter bore of said bushing and cooperating therewith to provide a pressure differential area effective to urge separation between said sleeve and said bushing; a manually operated plunger having a small diameter slidably disposed in said sleeve and a large diameter slidably disposed in another portion of said stepped diameter bore of said bushing such that a pressure differential area is formed between said sleeve and said plunger which is effective when pressurized to urge separation between said sleeve and said plunger; ring means secured in said bushing for limiting the movement of said sleeve in one direction relative to said plunger; spring means disposed between said plunger and said valve spool such that movement of said plunger imposes a spring bias force on said valve spool; and manual input means maintained in abutment with said plunger and being movable with said accelerator pedal to cause said plunger to move toward said valve member and compress said spring when the accelerator pedal is depressed, said manual input means engaging said sleeve at a predetermined position of said accelerator pedal to create an increased reaction force on said accelerator pedal which is proportional to the differential area between said sleeve and said bushing.

2. A pressure regulating throttle valve for use with a power transmission and a manually operated accelerator pedal movable to a plurality of positions by an operator, said pressure regulating valve comprising: a valve body having a stepped diameter central bore; a downstream pressure regulator valve spool slidably disposed in a first portion of said stepped diameter bore of said valve body; a bushing slidably disposed in a second portion of said stepped diameter bore of said valve body at a location displaced longitudinally from said valve spool, said bushing including a centrally disposed stepped diameter bore having a large diameter portion and a small diameter portion separated by a shoulder; a sleeve slidably disposed in the large diameter portion of said stepped diameter bore of said bushing and cooperating with said shoulder to provide a first pressure differential area effective to urge separation between said sleeve and said bushing; a manually operated plunger having a small diameter slidably disposed in said sleeve and a large diameter slidably disposed in said small diameter portion of said stepped diameter bore of said bushing such that a second pressure differential area is formed between said sleeve and said plunger which is effective when pressurized to urge separation between said sleeve and said plunger; ring means secured in said bushing for limiting the movement of said sleeve in one longitudinal direction relative to said plunger; spring means disposed between said plunger and said valve spool such that movement of said plunger imposes a spring bias force on said valve spool; and manual input means maintained in abutment with said plunger and being movable with said accelerator pedal to cause said plunger to move toward said valve member and compress said spring when the accelerator pedal is depressed, said manual input means engaging said sleeve at a predetermined position of said accelerator pedal to create an increased reaction force on said accelerator pedal which is proportional to the differential areas.

* * * * *